United States Patent [19]

Doernbach, Jr. et al.

[11] Patent Number: 5,029,202
[45] Date of Patent: Jul. 2, 1991

[54] INCOMING TELEPHONE CALL DIRECTOR

[76] Inventors: Robert C. Doernbach, Jr., 4390 SW. 52nd Ct., Ft. Lauderdale, Fla. 33314; Jack O'Neill, 8202 NW. 37th St., Coral Springs, Fla. 33065

[21] Appl. No.: 495,612
[22] Filed: Mar. 19, 1990
[51] Int. Cl.5 ............................................. H04M 1/72
[52] U.S. Cl. .................................... 379/201; 379/375; 379/245; 379/387
[58] Field of Search ............... 379/179, 167, 201, 373, 379/375, 245, 246, 258, 268, 387

[56] References Cited

U.S. PATENT DOCUMENTS 4,674,115  6/1987  Kaleita et al. ...................... 379/201

Primary Examiner—Stafford D. Schreyer
Attorney, Agent, or Firm—Emrich & Dithmar

[57] ABSTRACT

An incoming telephone call director is intended for use with a Ring-Master service which provides different ring signals on a single telephone line to selectively access one of several devices on the line. The call director ignores a first ring, counts the pulses in the next ring, and then directs the next subsequent ring to a selected telephone or device such as a computer modem, facsimile, telex, etc., on the single telephone line. A different sounding ring signal is used to identify and access each telephone or device on an individual basis. The call director senses an Off-Hook condition for the telephone or any one of the devices and connects that device to the single telephone line to provide a Dial Tone to permit a plurality of such devices to share a single telephone line without interfering with each other or telephone calls on the line. Although the first pulse is ignored for call routing purposes, the call director converts this complete or partial high voltage pulse to power itself in eliminating the requirement for line isolation or a battery operated supply. A lockout circuit allows only one line at a time access, while the system automatically begins waiting for the next call or for one of the internal lines to go Off-Hook following completion of a call.

14 Claims, 2 Drawing Sheets

INCOMING TELEPHONE CALL DIRECTOR

BACKGROUND OF THE INVENTION

This invention relates generally to telecommunications receiving equipment and is particularly directed to apparatus for directing incoming calls on a single telephone line to a telephone or one of a plurality of communications devices in accordance with coded pulses in the ring signal.

Coded ring signals are used in telephone communications to indicate which of several telephones on a single line the caller wishes to reach. Ring-Master is a service currently available that provides different ring signals to a single telephone line for switching to up to three different telephone numbers on a single line. An example of this is where three members of the same family may have different telephone numbers, but will be charged for only a single telephone line plus the Ring-Master service charge. When any one of the three telephones numbers is dialed, the telephone company switches the call to the single telephone line and provides a different sounding ring signal for that particular desired telephone number. In this system all of the telephones on the line ring at the same time with the same ring.

So long as the human element in terms of answering the telephone is present, this ring coded approach is acceptable. Even a single machine that uses a telephone network such as a computer modem, a facsimile, a telex, etc., which is set to answer on a fourth or higher ring may be coupled to the single telephone line and become part of the Ring-Master system. However, the coded pulse approach cannot accommodate two or more such machines which are capable of only counting the number of rings and cannot recognize and operate on a given ring signal pattern.

The present invention addresses the aforementioned limitations of the prior art by providing an apparatus and method for monitoring incoming ring signals, detecting the ring signal pattern, and automatically switching the call to a telephone or to one of a plurality of machines coupled to a single telephone line in accordance with the particular ring signal received. The ring signal is provided with a pulse pattern for designating the telephone or particular machine which has been dialed. The present invention also senses when one of the telephones or machines goes Off-Hook in trying to place a call and connects that telephone or machine to the single telephone line to provide a Dial Tone. In this way, two or three machines can share a single telephone line without interfering with each other or with outgoing telephone calls on the same line. The incoming ring signal is provided with coded information which the present invention detects, interprets and then decides to which telephone or device the incoming call is to be routed.

OBJECTS AND SUMMARY OF THE INVENTION

Accordingly, it is an object of the present invention to route telephone calls on a single line to a telephone or one of a plurality of communications devices each identified by a particular ring signal pulse pattern.

Another object of the present invention is to automatically switch an incoming telephone call to one of a plurality of communications devices in accordance with coded information in the ring signal.

Yet another object of the present invention is to provide a single line telephone communications system capable of handling a plurality of communications devices on the line without interfering with each other in either receiving or initiating telephone calls.

A further object of the present invention is to provide a telephone call routing system which does not require batteries, is isolated from AC line voltage, and operates on ring signal power.

A still further object of the present invention is to provide an arrangement for directing incoming telephone calls which employs a discrete component, high voltage approach rather than digital signal processing.

It is another object of the present invention to provide a telephone call director arrangement particularly adapted for use with a pulse coded Ring-Master system for automatically routing incoming telephone calls to one or more communications devices coupled to a single telephone line.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
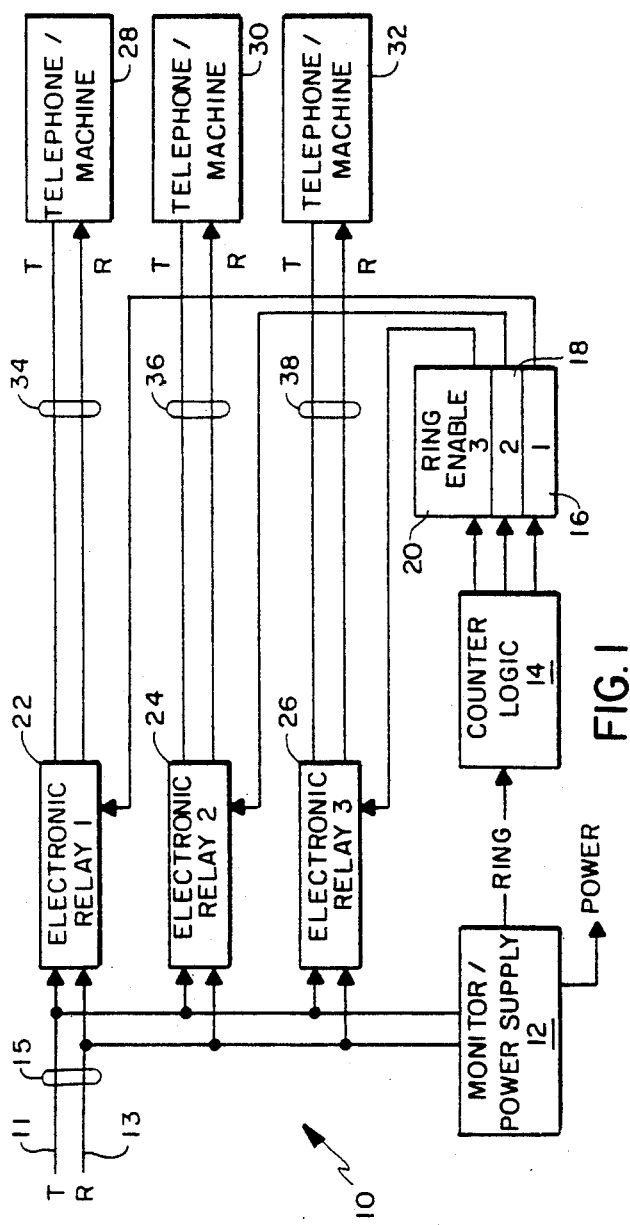
FIG. 1 is a simplified block diagram of an incoming telephone call director in accordance with the principles of the present invention.

Referring to FIG. 1, there is shown a block diagram of an incoming telephone call director 10 in accordance with the present invention. Briefly, a single telephone line 15 including tip (T) and ring (R) conductors 11 and 13 is coupled to normally opened first, second and third electronic relays 22, 24 and 26 as well as to a line monitor 12. The line monitor 12 detects when there is an incoming ring signal from the telephone company central office on the telephone line 15 and provides a logic level duplicate of the ring signal to the counter logic 14. The counter logic 14 interprets the duplicate ring signal and determines which internal telephone line is to receive the incoming call. The counter logic 14 then provides a signal to either a first, second or third ring enable circuit 16, 18 or 20, as appropriate. One of the driver circuits 16, 18 or 20 then activates its associated electronic relay 22, 24 or 26 and one of the telephones or machines 28, 30 or 32 coupled to the activated line then receives the ring signal from the telephone line 15. The designated telephone or machine is then answered in the normal manner. When the call is complete, and all devices are On-Hook, the electronic relay releases. The call director 10 then again waits for the next incoming call or for one of the internal lines 34, 36 or 38 to go Off-Hook.

The call director 10 is passive during call initiation. The loop current and voice currents simply pass through the electronic relays. The lock-out provision discussed below is provided by these "electronic relays". Isolation is provided between the telephone network and the logic elements of the call director 10 by means of these electronic relays which are actually optical isolators. The following paragraphs provide a detailed description of the configuration and operation of the inventive call director 10. The various elements of the call director 10 shown in FIG. 1 and discussed above are also shown in FIG. 2 in dotted line form, together with the various components which comprise these system elements.

Figure 2:
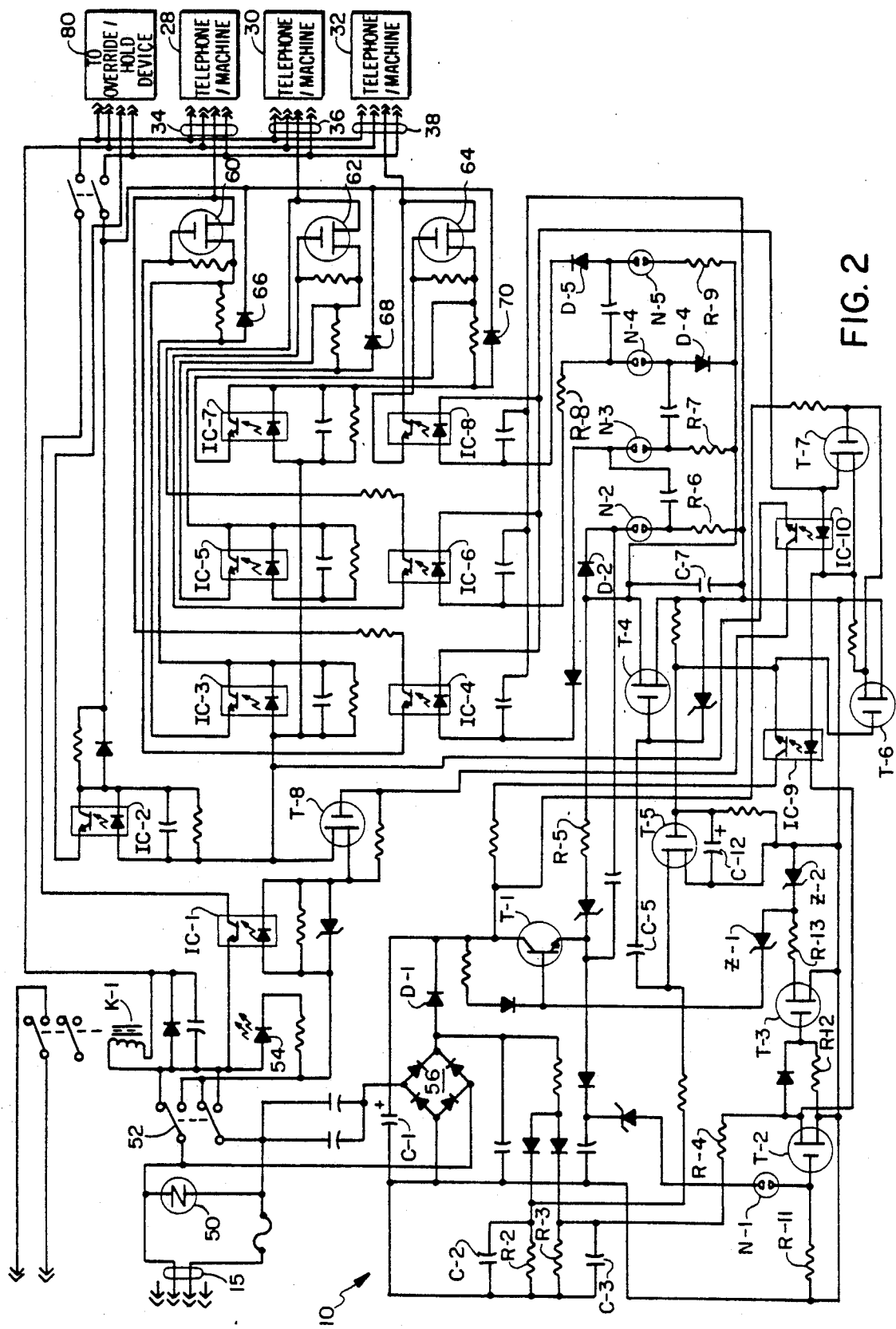
FIG. 2 is a schematic diagram illustrating additional details of the incoming telephone director of FIG. 1.

Referring to FIG. 2, the incoming phone line 15 is fused with a standard fuse. MOV 50 (metal oxide varistor) serves to protect the incoming telephone line 15 for high voltage surges exceeding 300 volts. The MOV will blow the fuse in the event of excessive voltage.

An installer of the call director 10 must switch the polarity switch 52 to extinguish a light emitting diode (LED) indicator 54 in order to ensure that an input voltage having the proper polarity is provided to the call director, which is polarity sensitive. A bridge rectifier 56 is AC coupled across the incoming line for rectifying the ring voltage for storage in a 150 microfarad capacitor C-1. Capacitor C-1 is isolated from the output voltage of the bridge rectifier 56 by means of a diode D-1 to permit two filter networks to separate the ring duration measurement and ring burst detection functions. This filter network includes a first filter comprised of a capacitor C-2 and resistor R-2 and a second filter comprised of a capacitor C-3 and a resistor R-3. The combination of capacitor C-3 and resistor R-3 filters out the few tenths of second interrupts to provide a standard ring duration pulse of 2–3 seconds. The filter comprised of the combination of capacitor C-2 and resistor R-2 responds to the short ring interrupt, if present, to provide a pulse for each ring burst during a standard ring. There is thus one "long" pulse signal representing a standard ring period at resistor R-4 and a "short" pulse signal at capacitor C-5 representing the number of rings during this standard period. In the present case, the number of rings which may occur during this standard period is either one, two or three.

A capacitor C-4 filters a 20–30 Hz component out of the rectified output voltage of the rectifier bridge 56.

The voltage at the cathode of diode D-1 is coupled to the collector of NPN transistor T-1. The base voltage of transistor T-1 is established by Zener diodes Z-1 and Z-2. The emitter of transistor T-1 follows the base voltage at a few emitter of transistor T-1 follows the base voltage at a few volts less than the base voltage value. The transistor T-2 functions as a field energized transistor (FET) switch which is off until neon lamp N-1 conducts. Before the ring voltage is applied to the telephone line 15, transistor T-2 is nonconductive. Thus, FET T-3 is turned on by a long positive ring pulse from resistor R-4. When transistor T-3 turns on, 33 volt Zener diode Z-2 is shorted out producing a base voltage at transistor T-1 of 47 volts. By thus shorting out Zener diode Z-2 and turning off transistor T-1, the call director 10 ignores the first ring signal regardless of its length. If the first ring signal is too short to supply sufficient energy to fully charge capacitor C-1, the next ring is taken by the call director to be the first ring signal as described in the following paragraphs.

While the first ring signal is present, the long pulse signal with any short interrupts filtered out by the filter circuit comprised of capacitor C-3 and resistor R-3 turns on transistor T-3 as described above. The turn-on of transistor T-3 establishes the base voltage of transistor T-1 at 47 volts. The voltage at the emitter of transistor T-1 during this first ring period is not sufficient to fire any of the neon lamps described below. When the "long" pulse ends, and following a few tenths of a second timing interval, the DC voltage at the collector of transistor T-1 is whatever the voltage was after the first ring. This voltage will typically be sufficient to fire neon lamps N-1 and N-2. The base voltage of transistor T1 will then rise (by 33 volts) after the end of the long ring pulse period, because transistor T-3 is then off. This permits sufficient voltage at the emitter of transistor T-1 to fire neon lamps N-1 and N-2. Following the first long ring pulse and during a no ring interval of approximately three seconds, transistor T-2 is turned on by virtue of the firing of neon lamp N-1. With transistor T-2 rendered conductive, the "long" ring pulse is shorted out and transistor T-3 is prevented from turning on during the next ring signal. Neon lamp N-2 is also on during this period. If capacitor C-1 is sufficiently charged, it will maintain neon lamps N-1 and N-2 on until the next ring. If capacitor C-1 has not sufficiently charged to sustain neon lamps N-1 and N-2, capacitor C-1 will again be charged with a full length ring signal which will then be considered by the call director 10 to be the first ring to sustain neon lamps N-1 and N-2 on for a long enough period.

Neon lamps N-2, N-3, N-4 and N-5 are connected as a modified Manley-Buckley ring counter. Neon lamp N-2 will light first because its circuit is complete through resistor R-5, diode D-2 and resistor R-6 to minus voltage. Neon lamps N-3, N-4 and N-5 are not connected in a complete circuit and thus are not turned on until transistor T-2 is turned on by neon lamp N-1. In this manner, the counter comprised of neon lamps N-2 through N-5 is initialized with the turn-on of neon lamp N2 at the end of the first ring signal and during each subsequent quiet interval.

Ring pulses are counted in the following manner. The short pulses at capacitor C-5 begin at the start of each ring burst following a quiet period. A ring without short interrupts will produce one pulse. A ring with one interrupt gives rise to two pulses, while a ring with two interrupts results in three pulses. An FET switch T-4 is turned on by these positive ring pulses. Turn-on of transistor T-4 shorts out the neon lamp voltage source and, in effect, provides an "off" pulse to the Manley-Buckley counter comprised of neon lamps N-2 through N-5. One ring pulse turns neon lamp N-3 on during the next quiet period, while neon lamp N-4 is turned on if two pulses are received. Finally, neon lamp N-5 is turned on with receipt of three ring pulses. After the pulse, or pulses, are counted, the system is in the second interval between standard ring periods. The pulse counter must be stopped before the next ring period. This is accomplished by means of integrated circuit-9 (IC-9) and transistor T-5. Current from neon lamps N-3, N-4 or N-5 flows through diode D-2 within IC-9. The transistor side of IC-9 connects a plus voltage through a resistor to capacitor C-12. After capacitor C-12 is charged, transistor T5 is rendered conductive and transistor T-4 is inhibited from turning on, thus stopping the counting of the ring pulses. Capacitor C-12 introduces a timing delay which carries the counter circuit into the quiet period. By the time the next ring pulse arrives, one of the neon lamps is still lit and its current is flowing through its associated ring-enable optical isolator, i.e., IC-4, IC-6 or IC-8.

During the third ring period, the selected first, second or third internal line 34, 36 or 38 will receive the ring voltage. The neon lamp associated with the selected line will remain on during both ring and quiet periods until a device coupled to the selected line goes Off-Hook or the incoming ring stops.

IC-2, IC-3, IC-5 and IC-7 function as lock-out circuits. When the telephone line 15 is unused, each of the aforementioned IC's is an open circuit with a voltage of 40 to 50 volts. Once a device coupled to one of the internal lines 34, 36 or 38 goes Off-Hook, the voltage associated with that lockout circuit drops to approximately six to ten volts. These lock-out circuits allow the first detected Off-Hook condition to pass current through the IC, but subsequent off-hook devices do not pass current because of the lowered voltage. This causes sufficient current to flow through the lock-out IC to turn it on. IC-2 is the all ring line which causes each of the internal lines 34, 36 and 38 to carry a ring signal when a telephone number associated with one of these internal lines is dialed.

IC-3, IC-5 and IC-7 each have a respective FET 60, 62 and 64 in series with their outputs for the purpose of inhibiting ring current. Each of the FET's 60, 62 and 64 includes a respective reverse shunt diode 66, 68 and 70. Each of these reverse shunt diodes allows DC current to pass through a respective one of the telephones/machines 28, 30 and 32. Each of the ring enable IC's, i.e., IC-4, IC-6 and IC-8, turns on a respective one of the aforementioned FET's 60, 62 and 64 in order to provide a ring signal to the respective telephone/machine 28, 30 and 32 coupled to the first, second and third internal lines 34, 36 and 38, respectively.

Transistors T-6, T-7, T-8 and IC-10 inhibit the all ring voltage until counting of the received ring signals by the neon lamps N-2, N-3, N-4 and N-5 has stopped. Thus, in the present invention the first ring signal is ignored while capacitor C-1 stores its power for later discharge for driving the call director 10. The aforementioned ring pulse counting arrangement which includes neon lamps N-2, N-3, N-4 and N-5 then counts the pulses in the next received ring signal, followed by coupling of the internal line to which the desired telephone/machine is connected to the incoming telephone line 15 in order to direct the next received ring signal to the selected internal line. The lock-out circuit described above permits only one of the three internal lines 34, 36 and 38 at a time to have access to the incoming telephone line 15.

Figure 3:
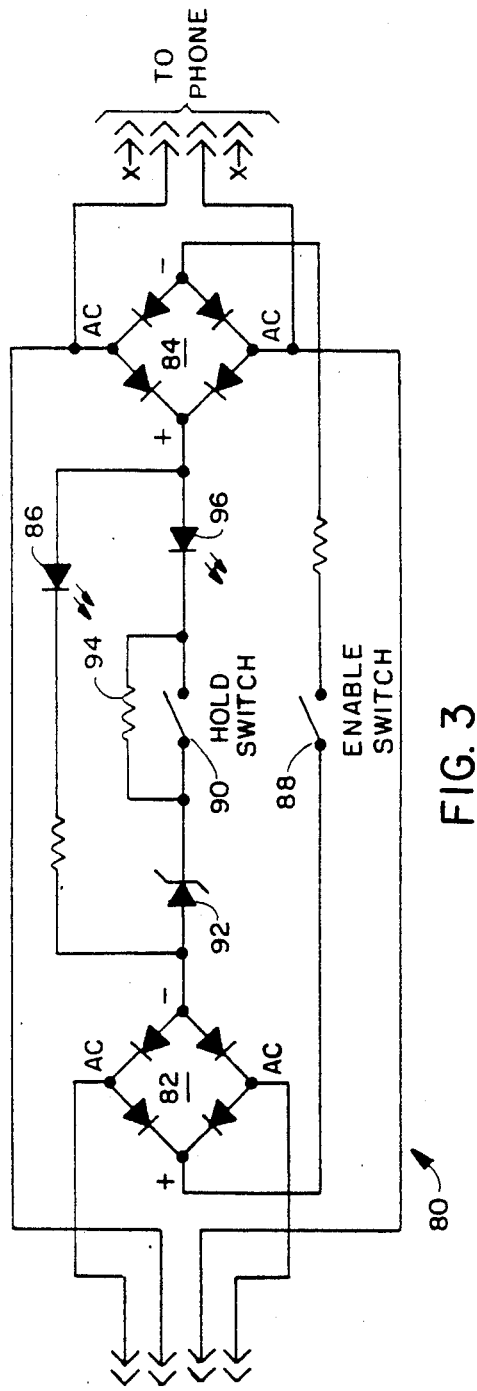
FIG. 3 is a schematic diagram of an override/hold circuit for use with the incoming telephone call director of the present invention.

An optional override/hold device 80 shown in schematic diagram form in FIG. 3 is provided to accommodate other accessories coupled to the call director 10 of the present invention. A relay K-1 couples the call director 10 to remote equipment (not shown) by pulling up upon detection of an offhook condition. This makes the call director 10 compatible with 1 A 2 key systems, the popular multibutton telephone system used by small businesses.

The override/hold device 80 is a separate unit from the call director 10. First and second rectifying bridges 82, 84 compensate for reversed tip and ring lines (reversed polarity). The first and second rectifying bridges 82, 84 render the override/hold device 80 insensitive to polarity. A red light emitting diode (LED) 86 illuminates when any machine or device connected to one of the internal lines is off-hook and thus serves as an in-use indicator. This is accomplished by means of previously described IC-2 shown in FIG. 2. If it is desired to override the lock-out circuit and to access the incoming telephone line with another one of the telephones or machines, a user of the system may select and engage the enable switch 88. With the enable switch 88 engaged, defeats the lock-out circuit and employs diodes 66, 68 or 70 in the call director 10.

With a telephone coupled to the override/hold device 80, a user can engage a hold switch 90 while hanging up the telephone to keep the line off-hook. This permits a user to go to another telephone coupled to one of the other internal lines or to have another user pick up a telephone elsewhere and have access to the telephone line accessed by the first user. A Zener diode 92 permits a holding current to flow through resistor 94 and allows for illumination of a yellow LED 96 indicating that that telephone line is on hold. The optional override/hold device unit 80 may be connected to one or more internal lines of a given telephone communications system including the all ring line. director for use with a single telephone line on which coded ring signals are provided to selectively access one of a plurality of telephones or other communications machines or devices which are each on a respective internal line coupled to the common incoming telephone line. The call director is powered by the incoming ring signals and requires neither an AC source nor battery power. Thus, AC line isolation is provided and the need for battery replacement is eliminated. A high degree of power efficiency is achieved through the use of high voltage FET's and neon lamps which make the use of ring power possible. The pulse coded ring signals are used to identify and access each telephone or machine on an individual basis, with off-hook detection provided to permit a plurality of such devices to share the single telephone line without interfering with each other or telephone calls on the line. Lock-out circuitry enables only one internal line at a time, while the system automatically begins waiting for the next call or for one of the internal lines to go off-hook in initiating an outgoing call following completion of a call.

While particular embodiments of the present invention have been shown and described, it will be obvious to those skilled in the art that changes and modifications may be made without departing from the invention in its broader aspects. Thus, while this invention has been described with a three ring pulse coded system, it is not limited to use with such a system, but is compatible with a system employing virtually any number of coded ring pulses. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to limitation. The actual scope of the invention is intended to be defined in the following claims when viewed in their proper perspective based on the prior art.

I claim:

1. For use with a single telephone line to which are coupled a plurality of communications devices for receiving and transmitting telephone calls, wherein one or a predetermined plurality of successive ring signals is used to designate each of said devices for receipt of an incoming telephone call, apparatus for directing an incoming call to a respective one of said devices, said apparatus comprising:

ring sensing means coupled to the single telephone line for detecting ring signals on the telephone line;

counting means coupled to said ring sensing means for determining the number of ring signals received;

control means coupled to said counting means for decoding the number of ring signals and connecting a selected one of said devices designated by said one or predetermined plurality of ring signals to the telephone line for receiving the incoming telephone call;

telephone line monitoring means coupled to the telephone line and to said control means for detecting an On-Hook condition of the telephone line following completion of the incoming telephone call and for providing an On-Hook signal to said control means, whereupon said control means disconnects said selected device from the telephone line and said ring sensing means awaits receipt of a ring signal of another incoming telephone call; and off-hook detection means coupled to said control means for detecting an off-hook condition of one said devices to permit an outgoing telephone call on the telephone line.

2. The apparatus of claim 1 wherein said ring sensing means includes means for separating ring duration measurement and ring burst detection.

3. The apparatus of claim 2 wherein said means for separating ring duration measurement and ring burst detection includes first and second filter networks.

4. The apparatus of claim 2 wherein said ring sensing means includes means for ignoring a first received ring signal and for counting the number of rings in the next subsequent ring signal.

5. The apparatus of claim 4 wherein said ring sensing means further includes means for storing energy of said first ring signal and for subsequently discharging the energy for powering the apparatus.

6. The apparatus of claim 5 wherein said ring sensing means further includes chargeable means responsive to the first ring signal for storing energy of said first ring signal and for subsequently discharging said energy in powering the apparatus.

7. The apparatus of claim 1 wherein said counting means includes a plurality of neon lamps coupled in parallel.

8. The apparatus of claim 1 further comprising means for isolating said ring sensing means, said counting means, said control means and said off-hook detection means from the telephone line.

9. The apparatus of claim 8 wherein said isolation means includes a plurality of relays and opto-isolators.

10. The apparatus of claim 1 further comprising lock-out means for allowing coupling of only one of said plurality of devices at a time to the telephone line.

11. The apparatus of claim 10 wherein said lock-out means includes a plurality of opto-isolators coupled in parallel, wherein each of said opto-isolators is coupled to a respective one of the devices.

12. The apparatus of claim 11 further comprising lock-out defeat means coupled to said lock-out means for coupling more than one of said devices at a time to the telephone line.

13. The apparatus of claim 1 further comprising in-use indicating means for providing a visual indication that one of said devices is coupled to the telephone line.

14. For use with a single incoming telephone call line, a telephone call director for directing incoming telephone calls to a plurality of communications devices coupled to the telephone line, wherein each of said plurality of communications devices is uniquely identified by pulse coded ring signals, the telephone call director comprising:

first means coupled to the telephone line detecting a first ring signal and for storing a charge associated with said first ring signal for subsequent discharge in powering the telephone call director;

second means coupled to the telephone line for counting the number of pulses in a second ring signal;

third means coupled to said second means for decoding the pulses in the ring signal and for routing an incoming telephone call to one of the communications devices associated with the coded pulses of the second ring signal; and lock-out means coupled to each of the communications devices for detecting an on-hook condition for any one of the communications devices while preventing coupling to the telephone line of any other communications device.

* * * * *